United States Patent
Cobb

(10) Patent No.: US 10,231,019 B2
(45) Date of Patent: Mar. 12, 2019

(54) DIGITAL PARENTAL CONTROLS INTERFACE

(71) Applicant: Daniel B. Cobb, Rochester, MI (US)

(72) Inventor: Daniel B. Cobb, Rochester, MI (US)

(73) Assignee: Black Wave Adventures, LLC, Rochester, MI (US)

(*) Notice: Subject to any disclaimer, the term of this patent is extended or adjusted under 35 U.S.C. 154(b) by 0 days.

(21) Appl. No.: 14/384,973

(22) PCT Filed: Mar. 15, 2013

(86) PCT No.: PCT/US2013/032216
§ 371 (c)(1),
(2) Date: Sep. 12, 2014

(87) PCT Pub. No.: WO2013/138743
PCT Pub. Date: Sep. 19, 2013

(65) Prior Publication Data
US 2015/0082335 A1 Mar. 19, 2015

Related U.S. Application Data

(60) Provisional application No. 61/611,357, filed on Mar. 15, 2012.

(51) Int. Cl.
*H04N 21/454* (2011.01)
*H04N 21/475* (2011.01)

(52) U.S. Cl.
CPC ..... *H04N 21/4542* (2013.01); *H04N 21/4751* (2013.01)

(58) Field of Classification Search
CPC ........... H04N 21/4542; H04N 21/4751; H04N 7/163; H04N 21/4532; H04N 7/165; H04N 21/4623; H04N 21/84; H04N 21/4755; H04N 21/454; G06Q 20/35785; G06F 21/31; G06F 21/30; H04L 63/10; H04W 12/06
USPC ..... 345/660; 705/14.61, 26.14; 725/13, 134, 725/25, 28, 47, 58, 85, 9
See application file for complete search history.

(56) References Cited

U.S. PATENT DOCUMENTS

| | | | |
|---|---|---|---|
| 6,317,795 B1* | 11/2001 | Malkin | H04N 7/162 345/619 |
| 2002/0147782 A1 | 10/2002 | Dimitrova | |
| 2005/0010952 A1* | 1/2005 | Gleissner | G09B 5/06 725/46 |
| 2005/0028191 A1* | 2/2005 | Sullivan | H04N 5/4401 725/28 |
| 2008/0172689 A1* | 7/2008 | Feder | G06Q 30/02 725/28 |
| 2008/0235731 A1* | 9/2008 | Bryant | H04N 5/44543 725/44 |
| 2009/0234667 A1* | 9/2009 | Thayne | G06Q 10/00 705/300 |
| 2010/0094866 A1* | 4/2010 | Cuttner | G06F 17/30035 707/723 |

(Continued)

*Primary Examiner* — Ngoc K Vu
(74) *Attorney, Agent, or Firm* — Fishman Stewart PLLC

(57) ABSTRACT

A digital parental controls system and interface that limits media content from being viewed by using a rated numerical value system. Users will be able to block specific offensive content such as nudity without blocking specific content such as violence. This media system will simultaneously work with movies, music and video games.

23 Claims, 11 Drawing Sheets

(56) References Cited

U.S. PATENT DOCUMENTS

| | | | |
|---|---|---|---|
| 2010/0122293 A1* | 5/2010 | Craner | H04N 5/44582 725/40 |
| 2010/0070510 A1 | 8/2010 | Agarwal | |
| 2011/0065419 A1 | 3/2011 | Book | |
| 2011/0283311 A1* | 11/2011 | Luong | 725/28 |
| 2012/0054789 A1 | 3/2012 | Evans | |
| 2012/0060181 A1 | 3/2012 | Craner | |
| 2013/0047260 A1* | 2/2013 | Hoefel | G06F 17/30867 726/27 |

* cited by examiner

DIGITAL PARENTAL CONTROLS INTERFACE

CROSS-REFERENCE TO RELATED APPLICATIONS

This application is a U.S. National phase PCT/US13/32216, filed on Mar. 15, 2013 entitled "DIGITAL PARENTAL CONTROLS INTERFACE" which is based on U.S. Provisional Patent Application No. 61/611,357, filed on Mar. 15, 2012 entitled "A DIGITAL PARENTAL CONTROLS INTERFACE THAT LIMITS MEDIA CONTENT RATED BY A NUMERICAL VALUE SYSTEM".

FIELD OF TECHNOLOGY

A system for providing parental controls of media content, and more particularly, a device, system and methodology that allows parental control of specific undesired electronic content.

BACKGROUND

As the demand for and level of digital content continues to expand in our society, our youth continue to be exposed to content by producers that parents do not want their children to see. Unfortunately the movie and other industries do not police themselves nor do they successfully keep harmful content from minors. The openness of the internet provides the ability of minors to have continuous access to inappropriate content. This continues to be a problem as parents often cannot police the streaming content into their homes due to the lack of advances in digital control technology.

The problem with uncontrolled digital content is not limited to just movies. Digital media covers many aspects of our society and includes not only movies, but also music and video games. None of this digital media employs a common filtering or rating system that can be used by parents or other adults that may wish to preclude inappropriate content from coming into their homes. Search engines and media players also have no way of knowing if the content is appropriate for the value systems of their customers, other than G, PG, R ratings. And even though a movie rating may be provided on some content, such as movies, the movie ratings do not offer enough rating detail for most families nor do they provide any filtering options. Nor do the ratings break down with particularity and inform a user as to what content has caused a rating to be rated R, PG, or other rating.

It is not uncommon for one scene in a movie or one word in a video game to be the only offensive aspect of the media content. The current parental control technology may either block all PG content or none of it. It doesn't allow the user to block part of the content, and it doesn't allow the user to block content for specific offensive content. Current parental control technology blocks entire web sites, even those that offer valuable content for students because of one article or word. They block entire movies or video games because of the rating, when users might not be offended.

It would be desirable to provide a tool, system and methodology to block specific offensive content such as, but not limited to, nudity and language, without blocking specific content such as violence. Such improved media system should be flexible, selectable and work simultaneously with movies, music, video games, and other electronic mediums and products.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary embodiment of a parental controls system has an interface and provides a numeric rating to every media element in its content database for categories including, but not limited to, sex, language, violence, drugs, nudity and other parameters. The system then allows a user to set parental controls on each of these parameters. The system will automatically block all content that includes this content or removes the offensive elements from the content, so the user can experience media without offensive content.

Another embodiment provides a system that allows the user to have a single media player that can search and access digital movies, music, news and video games, blocking inappropriate content or even skipping inappropriate elements within the content.

Another embodiment of the system allows a user to be able to block specific offensive content such as nudity without blocking specific content such as violence. This media system will simultaneously work with movies, music, video games, and other content.

Another embodiment provides a media manager with a search engine and media player, wherein the search engine is improved to include the If-Then parameters of the parental controls system according to the user settings. The media player is modified with the ability to read and act on a timeline-based edit list with all potentially offensive material marked with "in" and "out" points on the timeline. The player is modified to replace the offensive content with transition content or no content that would offer a safe user experience without too much disruption to the consumption media.

Figure 1:
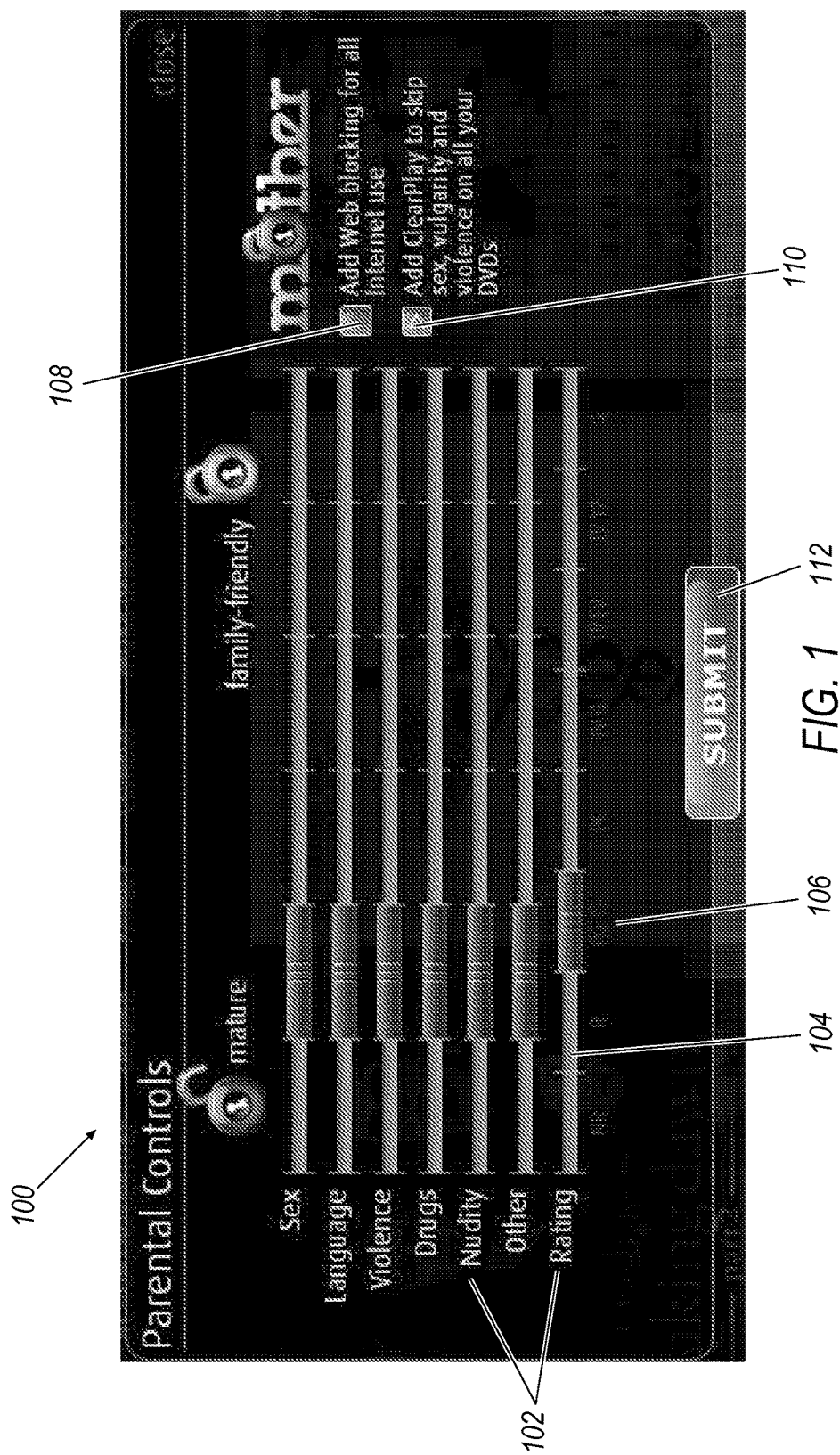
FIG. 1 illustrates a parental controls user interface, showing a scaled slide bar for allowing a person to control media content.

FIG. 1 depicts an exemplary screen shot of a parental controls user interface 100 that could be accessed via the internet page of a main user interface 200. This is the user interface a parent, guardian, or other may use which provides the ability to edit a filter for preferred search results. The parental controls user interface 100 is provided with a list of the multiple rating categories with a range from low to high, which could correlate to a mature to family-friendly scale. The rating filter can be used by many people including a parent, or for a linked user like a child, in order to establish different allowed results. The interface 100 includes rating categories 102 such as sex, language, violence, drugs, nudity, and others. A rating bar 104 is provided which can correlate to known rating categories 106 such a NR, R, PG-13, PG, TVG and more.

The user interface 100 also includes an add web blocking for all internet use tab 108, add ClearPlay to skip sex, vulgarity and violence on all of your DVD's tab 110, and a submit tab 112. The add web blocking tab 108 activates the system to use the filter on the content that is streaming from the internet. The add ClearPlay tab 108 permits a user to apply the desired filter on DVD products. Thus, the system 10 can be used to filter media content from multiple sources. It will be appreciated that the interface 100 may have other tabs and features.

Figure 2:
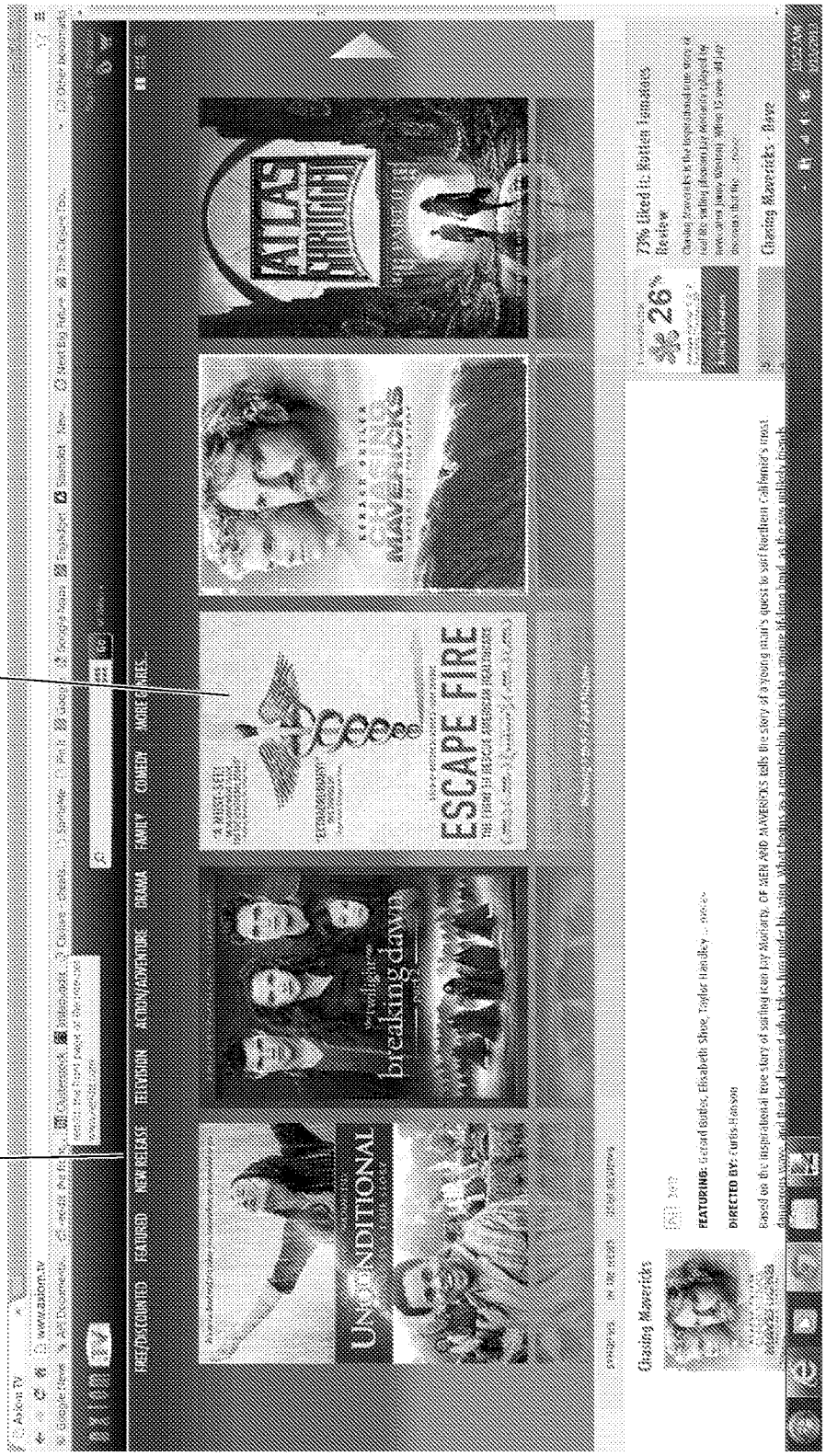
FIG. 2 illustrates a main user interface, showing what a user sees when logging into the Axiom TV web site.
Figure 11:
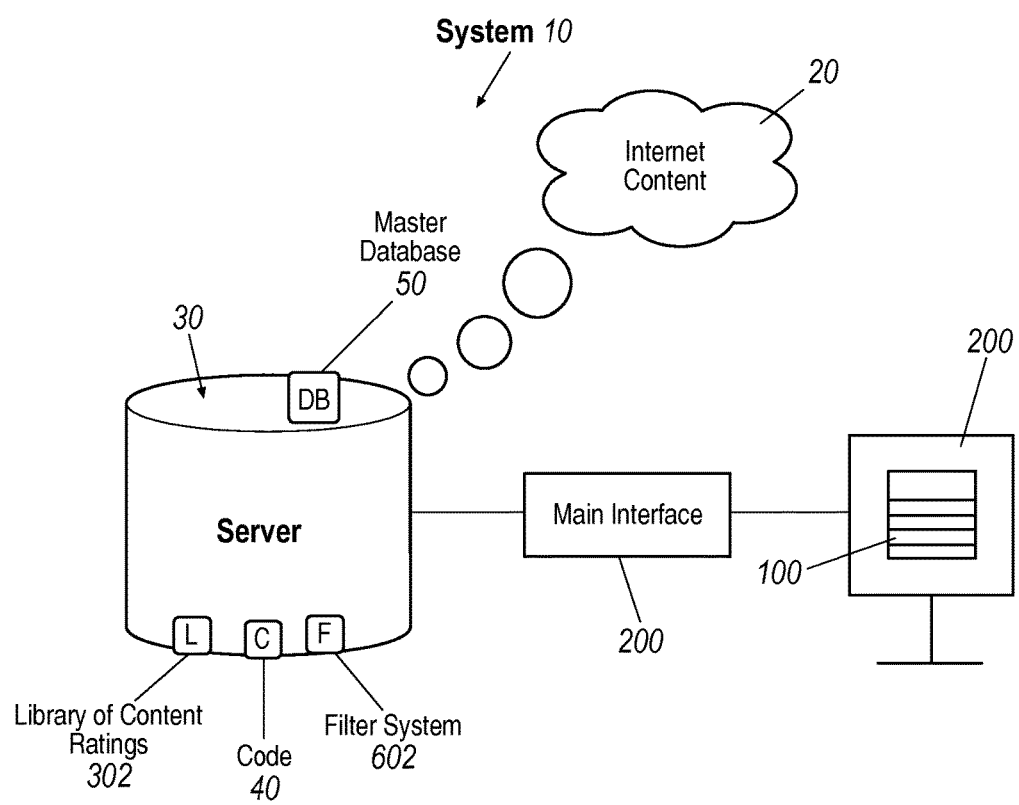
FIG. 11 illustrates a system including a network based platform to provide user interfaces of the present disclosure.

FIG. 2 depicts a main user interface 200 that is accessed via the internet by a user. This allows the system 10 to be accessed remotely and from anywhere as long as the internet 20 is available. The main user interface 200 can be on a network based platform and is the primary interface consumers drive through to access the system 10. See FIG. 11. A server 30 has a CPU and memory and hosts the program 40 which drives the system 10. The interface 200 includes categories 202 (FIG. 2) of content such as new releases, drama, family, and others, for the consumer to choose from. Thus, a library 204 of content can be built within the system 10 and saved on the server 30 or accessed via the internet 20.

Figure 3:
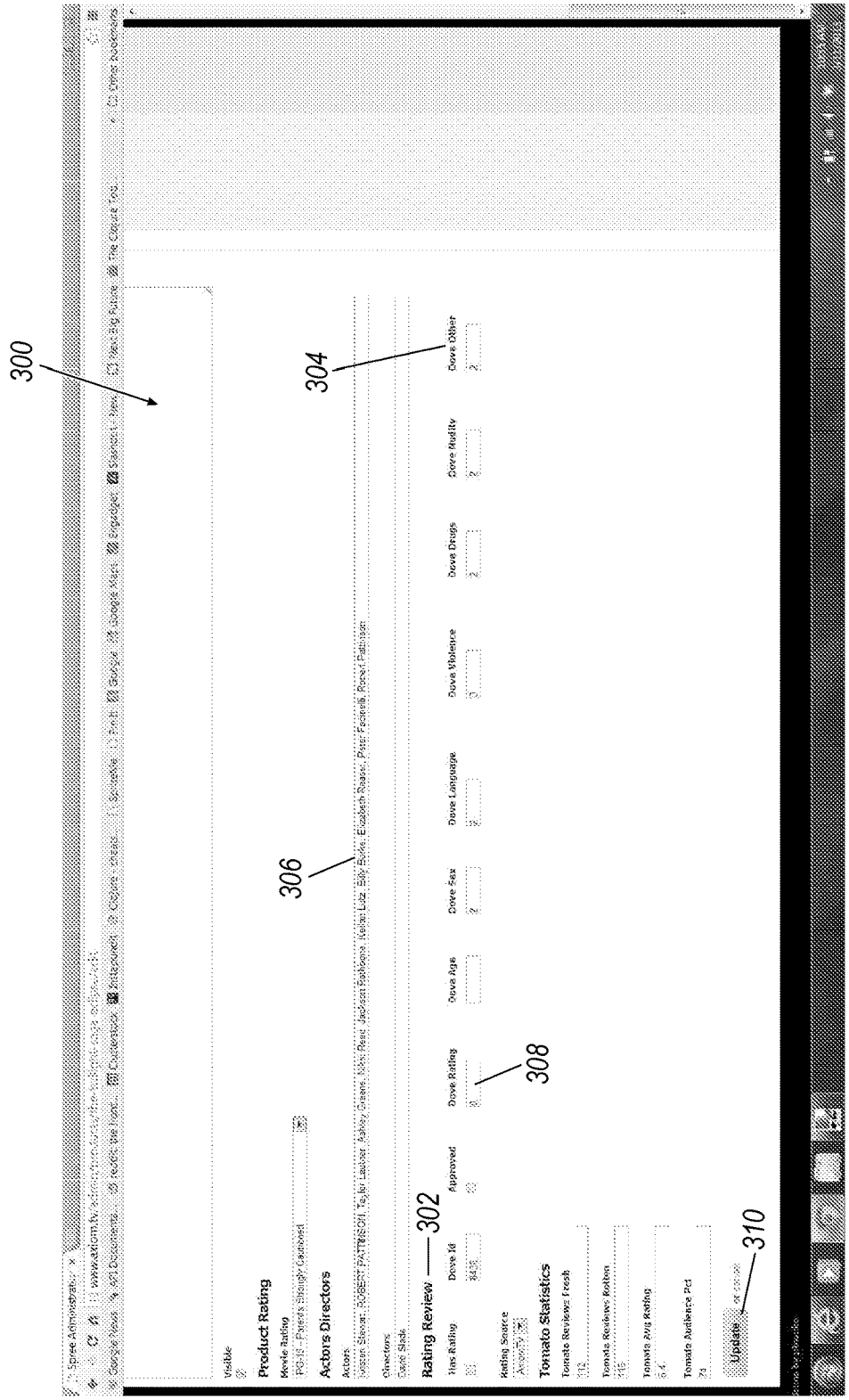
FIG. 3 illustrates a screen shot of an administrative ratings user interface.

FIG. 3 illustrates a screen shot for the administrative ratings user interface 300. This is one of the screens a manager of the system 10 can access in order to help build a library of content ratings 302. See FIG. 11. This process could be done automatically by the system 10 by pulling the information from other sources and propagating the fields 308 that are seen in the interface 300. The library 302 may collect ratings from an existing provider 304 and build the library from pre-existing information. A manager of the system 10 may input other data 306 such as actor information, directors, movie rating, and more. Once the manager has propagated the fields 308, a submit button 310 is pressed to save the information to the server 30.

Figure 4:
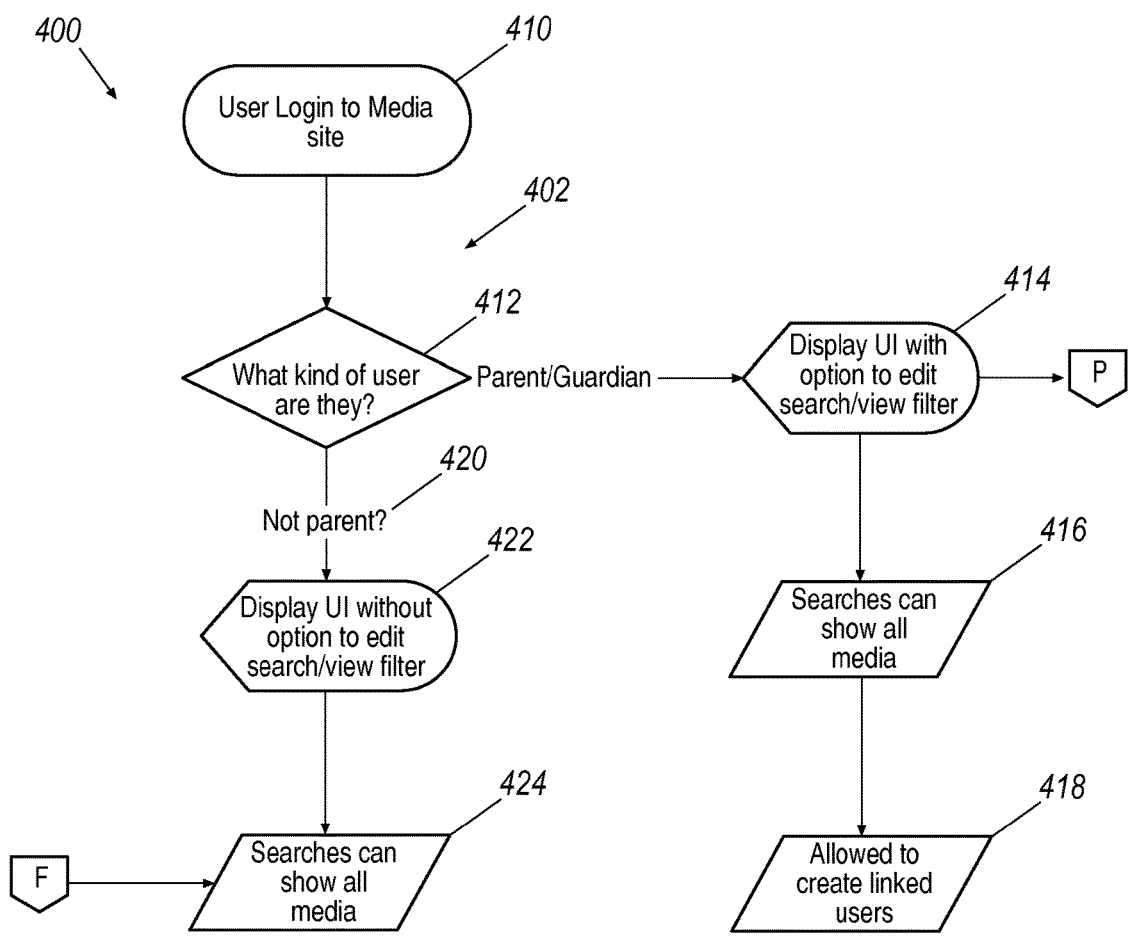
FIG. 4 illustrates a logic diagram of how the media manager module operates.

FIG. 4 illustrates a media manager module 400 and the algorithm or flow chart 402 that drives the decision making for this module. The media manager module 400 is a routine of the computer program 40 that operates on the server 30. The media manager 400 is accessed by entering through the main user interface 200 (FIG. 2). To access the media manager 400, the user logs into the site 410, and as part of the login process, the system 10 searches to see what kind of a user they are 412. If they are a parent or guardian, they are given an icon with an option to edit 414 the parental control settings for themselves, and for any users they are linked to. The user can then search to show all media 416 that passes through the filter. All displays of movies consist of a search (either the default search, or some typed in keywords) will only display results which fall within the parameters of the parental control setting. If a user is a parent or guardian, they are allowed to create user profiles for linked users 418. If a user is not a parent or guardian, they can't modify the search parental control filters, nor create linked users.

If the person that logs in is not a parent 420, then the system 10 will display a user interface without the option to edit a search or to view the filter 422. Under this method, the result of any searches will only show filtered media 424.

The media manager module 400 provides a system of searching and sorting media so that the user will find content throughout the digital universe. If content has a rating, the user will have access to the content, based on parental controls settings. If the content has no rating, the user will only have access if the ability to view non-rated content option is selected by the user.

The media manager module 400 acts as an optional search engine tool that allows the user to search for video, audio, text, images and interactive software ("Content") using the Web, media appliance (TV, radio), mobile devices or other digital technology. The media manager and search engine could adopt and add the rating and filtering system to its function. A video editor feature is optional and presents a feature for editing content and delivering cleaned content, on demand. Content can be acquired from distributors with edits (made for TV or airline versions), and content can be edited by third-party content providers.

Figure 5:
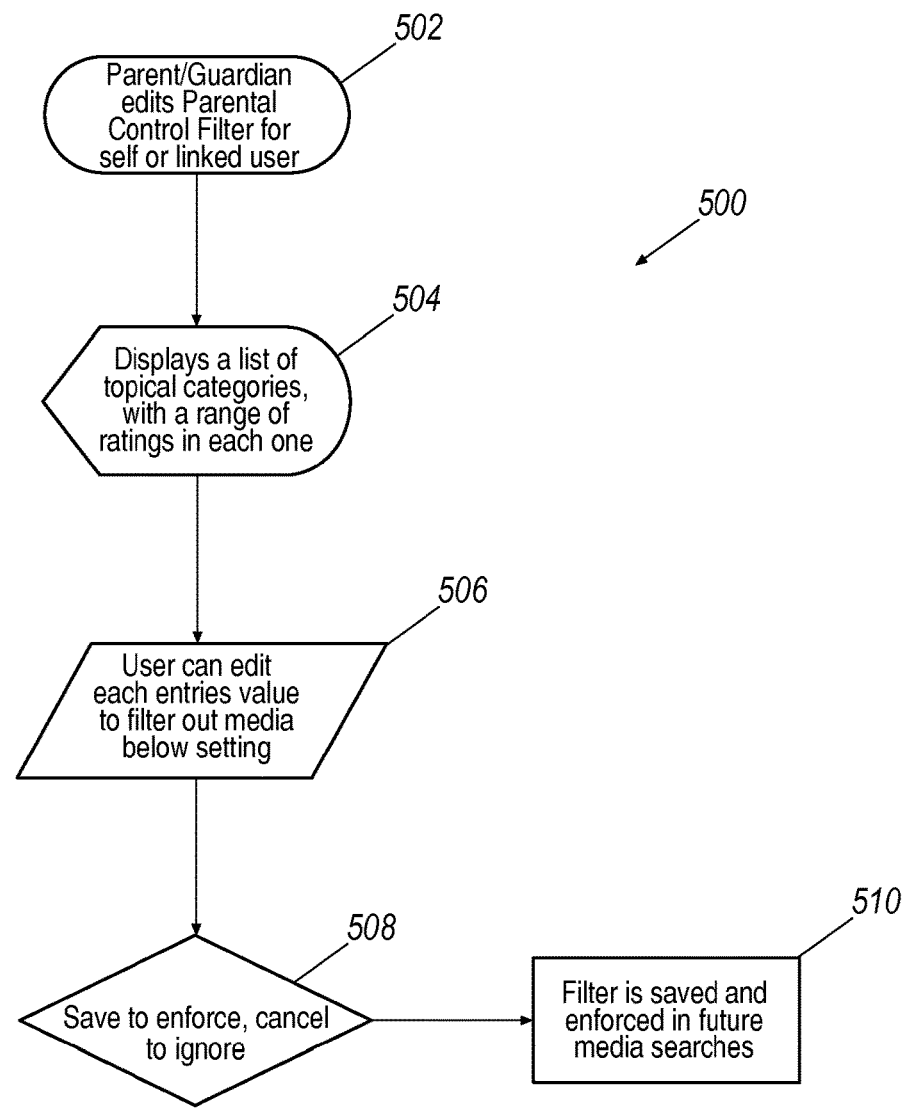
FIG. 5 illustrates a logic diagram of how the parental control user interface operates.

FIG. 5 illustrates a logic diagram 500 of the operation of the parental control user interface 100. The parental controls user interface 100 is depicted in FIG. 1 and is the feature that allows the user to manually set parameters of what he/she wants to have access to within his/her family or community. The user can set a numeric value to sex, language, violence, drugs, nudity or other potentially offensive content. The interface 100 becomes the input to a rating system that could be used with other search engines or media managers that already exist if the parental controls are applied with or without a user interface.

The logic diagram 500 for the parental control user interface includes the exemplary step of providing a parent editing a filter 502, displaying a list of topical categories, with a range of ratings in each one 504, allowing the user to edit each entries value to filter out media below the setting 506, saving to enforce, cancel or ignore the setting 508, and if saved is selected, then saving to the system the filter to enforce in future media searches 510. It will be appreciated that this algorithm can be modified to enhance performance of the system 10.

Figure 6:
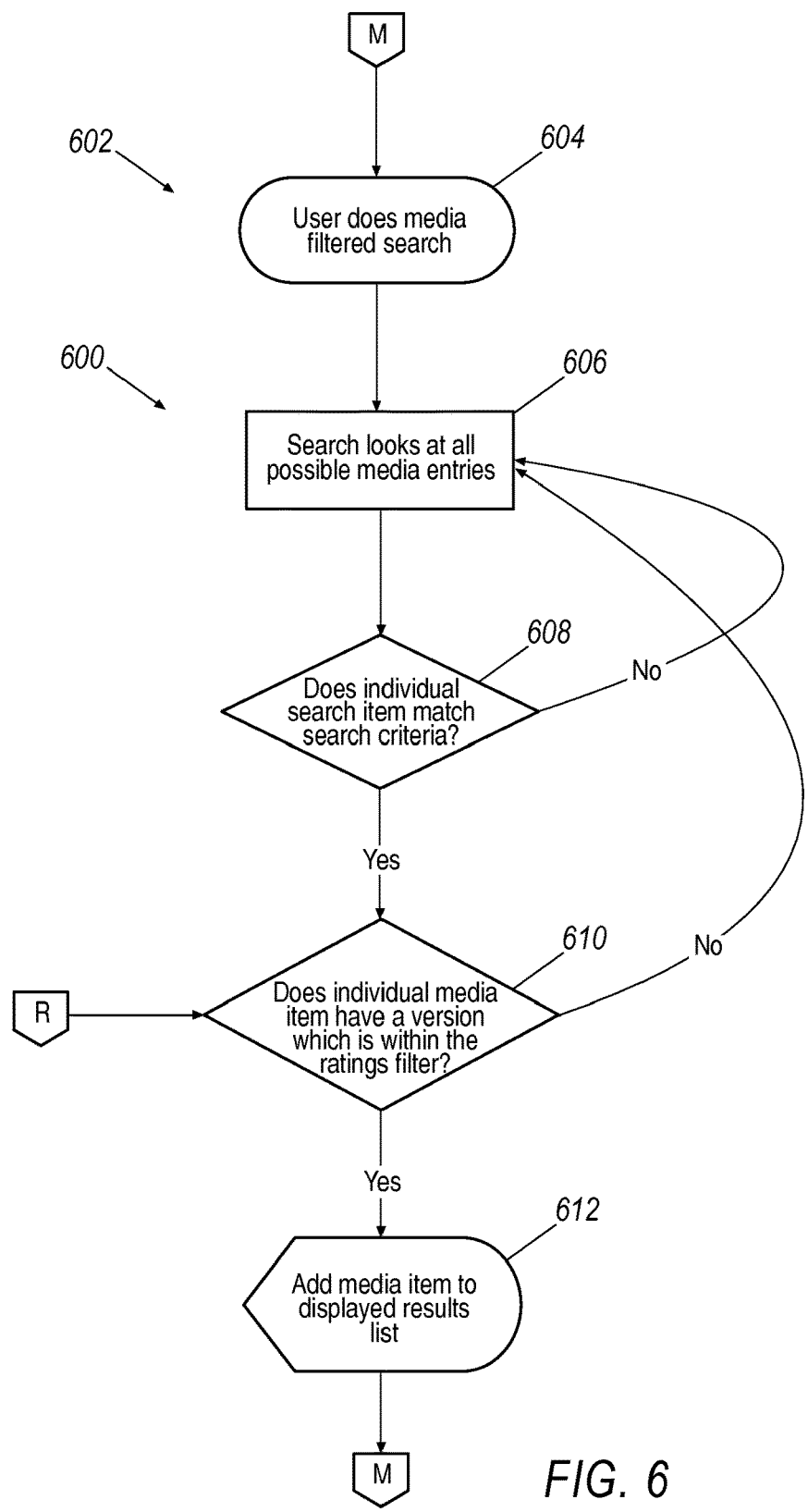
FIG. 6 illustrates a logic diagram of how the filtering system operates to extract undesirable content.
Figure 7:
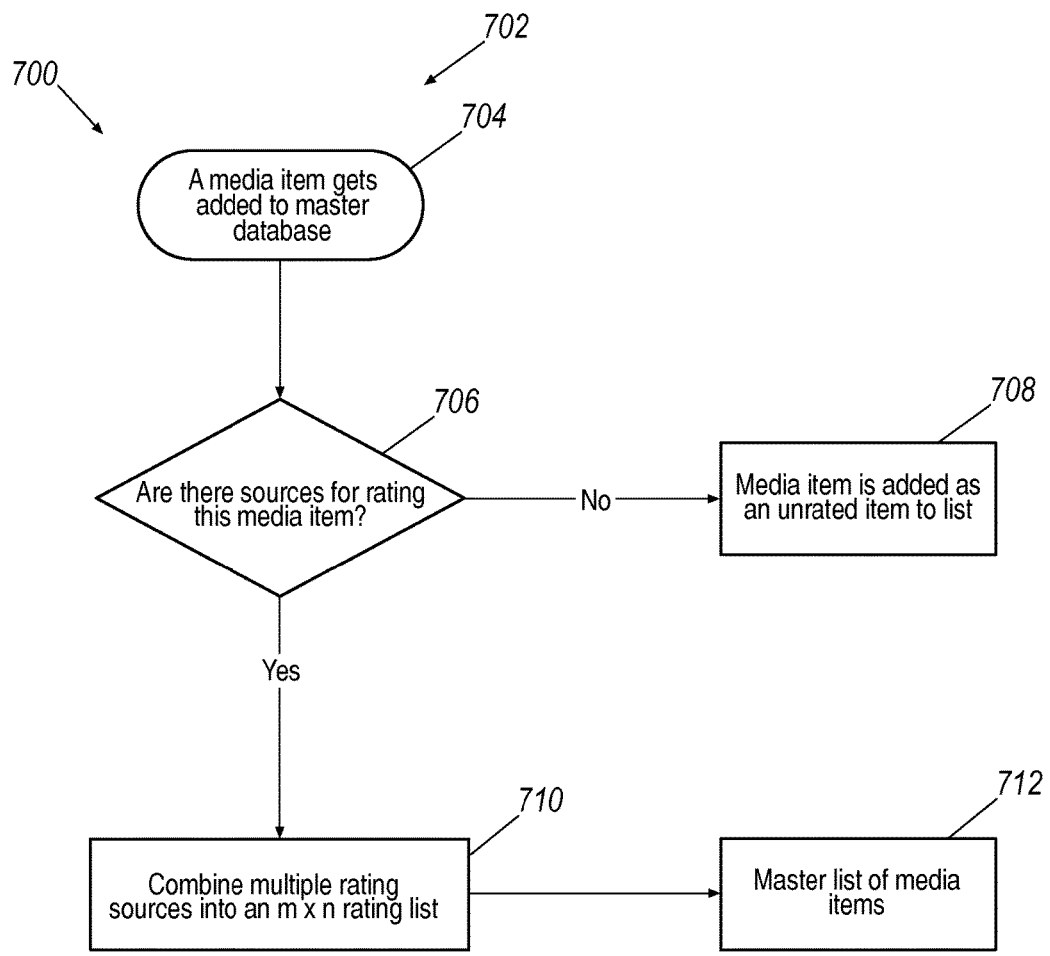
FIG. 7 illustrates a logic diagram of how the rating system operates.

FIG. 6. Illustrates a logic diagram 600 that is a module within the code 40 that is stored on the server 30, or even in the cloud. This logic forms the filtering system 602 and sets out the process of filtering content. This is the logic behind the scenes that interfaces with the inputs by a consumer at interface 100. Any searching by a user of the media database will use the associated rating filter system 600 to constrain the results. The setting on a particular category will limit any subsequent search to be lower or equal to the rating that the specified filter. Setting the filter to the highest settings will allow all media entries to be displayed.

The filter system 602 includes the following process steps. First it starts with the user does a media filtered search 604. Then the search looks at all possible media entries 606. Next it asks does individual search item match search criteria 608. If not, then the routine goes back to step 606.

If yes, then the process advances to determining does the individual media item have a version which is within the ratings filter 610. If no, then the process reverts to step 606. If yes, then the process adds media item to displayed results list 612.

The filtering system 602 compares the user settings from the parental controls user interface 100 with the rating system 702 for the content. If the numeric value of the content is within the parameters of what the user wants to allow, the content will be accessible to the user. If the numeric value of the content is within the parameters allowed by the user, the content will be accessible to the user in part or in whole, based on the user settings.

The rating system logic diagram 700 includes the step of a media item gets added 704 to the master database 50. Next decision of are these sources for rating this media item is asked 706. If the answer is no, then the media item is added as an unrated item to a list 708. If the answer to the question "are these sources for rating this media item" is yes, then the rating system combines multiple rating sources into a rating list 710. Thereafter a master list of media is updated 712.

The rating system 702 provides for all media entities loaded into the master database 50 (see FIG. 11) can have a rating assigned to it. If a media entity doesn't have one, it is unrated, which is treated as the highest possible rating. When a media entry is added to the database, ratings can be assigned to it both programmatically (from external rating sources like MPAA, IMDB, and Dove) and edited and reviewed by a system administrator editor. The ratings are organized into multiple categories (like sex, violence, drugs, etc.) that can range from low to high.

The rating system 702 is maintained in the database associated with all content presented to the user. The rating system 702 includes all known public rating systems such as the MPAA, TV and video game ratings as well as a custom database for each of the parameters set in the parental controls user interface. Other database sharing is used from sources such as the Dove Foundation as well as manually entered ratings from users and technology developers as well as artificial intelligence to detect offensive content in order to get complete content ratings.

The rating system 702 provides the data to the filtering system 602 so that the parental controls settings can be applied to give access or denial to part of the content or all of the Content. The rating system 702 is helpful because without a common rating system on each parameter of sex, language, violence, drugs, nudity or other, the system would have no basis of filtering. This rating system is applied to the content as a whole. This rating is also applied to individual chunks of content as well. Without filtering the rating system 702 will not block content for the user.

Figure 8:
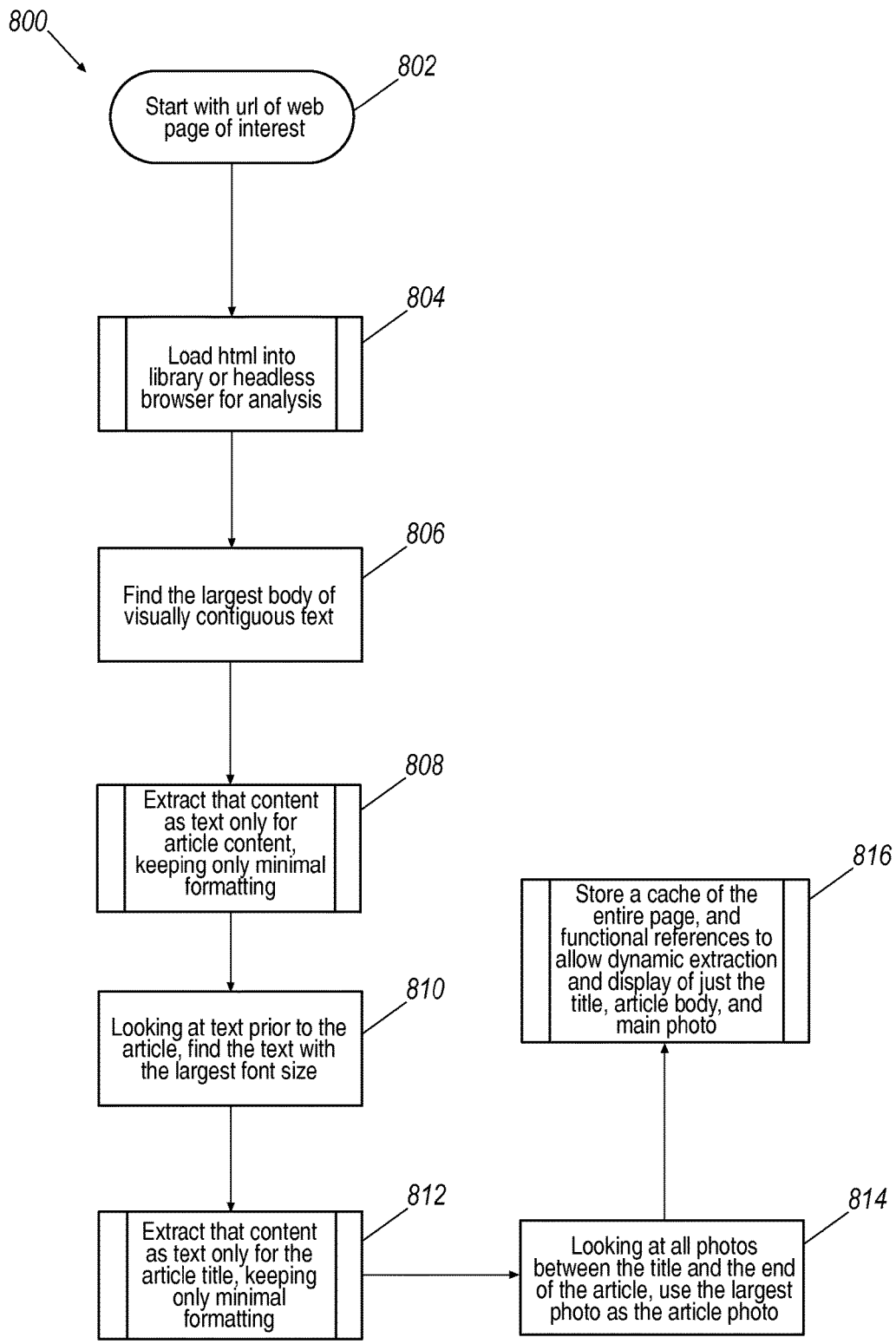
FIG. 8 illustrates a logic diagram for a mobile content extraction routine module.

FIG. 8 illustrates a logic diagram 800 for another module of the system called a mobile content extraction routine 802. The function of this module or routine is to take the essence of a web page article 900 (see sample at FIG. 9), and display only the most salient pieces of information with a consistent user interface for better readability and faster article navigation (see 950 sample at FIG. 10). The most salient pieces of information are the article title, its textual content, and one article photo if there is one. The extraction is performed on a given web page url of interest. A headless browser and/or html analysis library is used to be able to programmatically view and analyze the page. The main body of the article is obtained by finding the largest body of visually contiguous text on the page. Standard library routines are used to find and extract textual only contents plus minimal formatting like bold and italics. Text is considered visually contiguous if they are next to each other in the page display without separation by too much space (an experimentally obtained parameter) or any borders. Next, the title is obtained by finding the text element above the article that has the largest font size. Finally the article photo is obtained (if there is one) by grabbing the largest photo anywhere in the html between the title and the end of the article body. The entire page is stored in the database, along with functional extraction references to the previous pieces. The purpose of that being to be a better article viewer of articles, and not store an edited version of the article which have copyright issues.

With continued reference to FIG. 8, the logic diagram 800 starts with a URL of a web page of interest 802. Next html is loaded into a library of headless browser for analysis 804. Next the system finds the largest body of visually contiguous text 806. Then it extracts that content as text only for article content, keeping only minimal formatting 808. Next it looks at the text prior to the article, and finds the text with the largest font size 810. Then it extracts that content as text only for the article title, keeping only minimal formatting 812. Next it looks at all photos between the title and the end of the article, and uses the largest photo as the article photo 814. And finally, the system 10 stores a cache of the entire page, functional references to allow dynamic extraction and display of just the title, article body, and main photo 814.

Figure 9:
FIG. 9 illustrates a representative screen shot of a web site showing content that has not been extracted.
Figure 10:
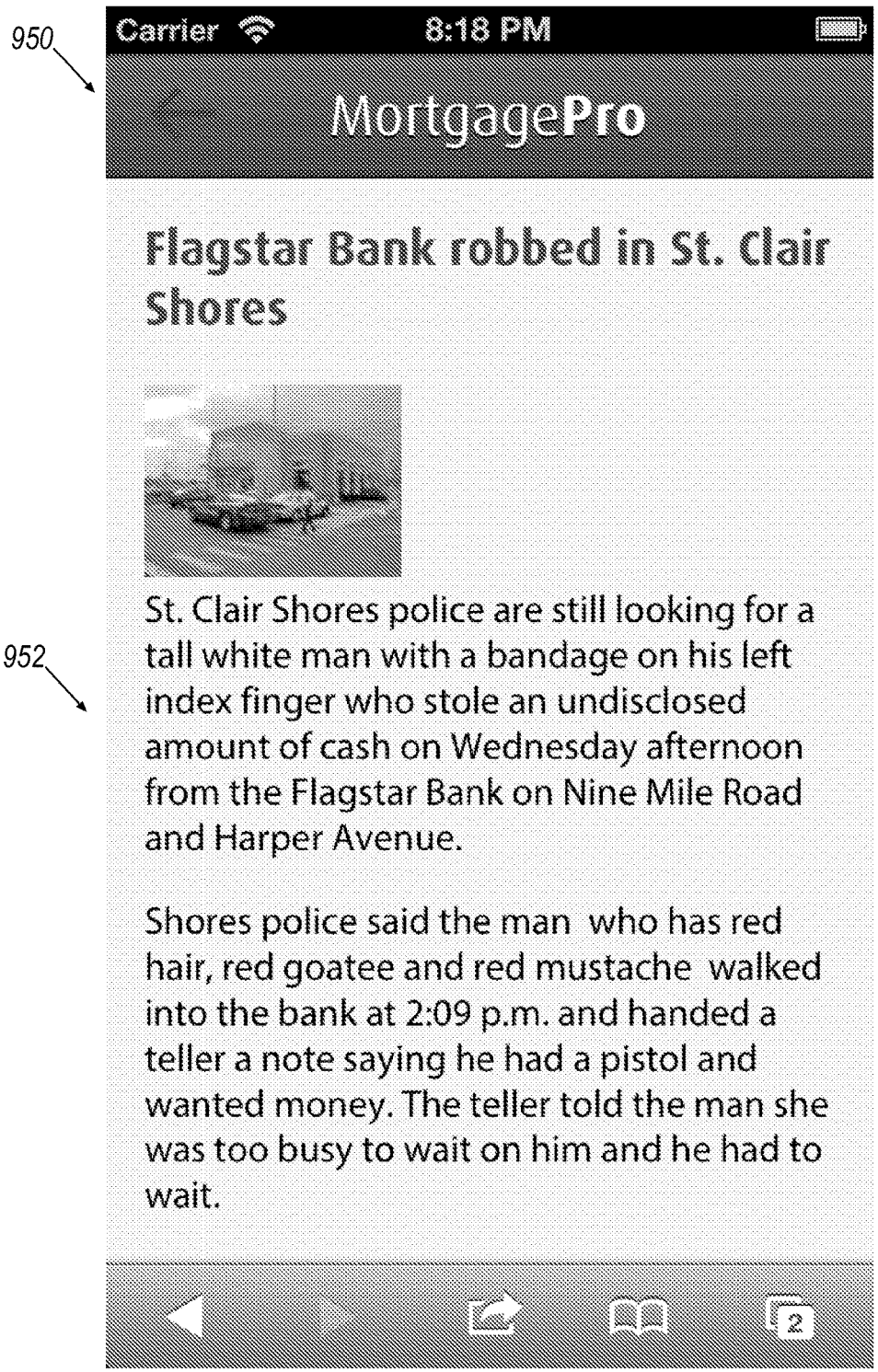
FIG. 10 illustrates a screen shot of the FIG. 9 web site after the content has been extracted using the FIG. 8 logic, but now showing preferred content.

FIG. 9 illustrates a representative screen shot 900 of a web site showing content that has not been extracted. The extraction process 802 as shown in FIG. 8 is implemented which results in a scrubbed or cleaned web page. FIG. 9 shows a web site 950 after it has been scrubbed 952. The preferred content is now shown.

All of the above components of the disclosure work individually and together to perform a unique function for an integrated media system with dual-function parental controls (both on the Content and within the Content itself). If the user searches for media content including but not limited to video, music, text, images or interactive software, find all possible matches, but don't make any visible yet to the consumer. If content has no rating and user has parental controls are off, then give the user access to content and make it visible. If the user has parental controls turned on, then filter content, blocking all non-rated content first. If the content has a rating, then filter content according to user settings. If the user has a setting to block content rated 3 or higher for a particular offensive element (such as nudity) and content contains material with a rating of 4 for the same offensive category, then the system blocks the content.

If the Content is segmented into rated content chunks, then only block the chunks of content that are offensive, allowing other content to become accessible and visible. For example, if one scene in a video game presents a nude woman and if the user has settings to block all nudity, only that scene would be removed from the game. However, if the content is not segmented into rated content chunks, block the content in its entirety. If filtering is complete, then the system makes visible and available to the user any content that passes the parental controls filters, and blocks all other content from any access.

The above steps and system 10 may be modified and yet remain within the spirit of the embodiments shown. The present system is a digital application which is developed to create a search engine which operates on an internet-based platform. It could use, but is not limited to, use of a combination of HTML and Javascript database technology, with web servers and high bandwidth Internet. The search engine is able to proactively crawl the Web and create a database that is responsive to users when they come to search for media they want to consume. However, the exemplary search engine will include a highly filtered and user managed database of media that will be ranked and rated on parameters for parental controls. The system 10 will allow users and system managers to input ratings on the content database.

For example, a movie such as "Facing the Giants" is rated with 5 stars from the Dove Foundation. The Dove Foundation gave this movie a "0" rating for sex, drugs, nudity and other, but it got a "1" rating for language and violence. The search engine is operable to pick up this rating from the Dove Foundation and store the rating for this movie in a database. Under this scenario, the filter should only show "Facing the Giants" as a search result if the user sets parental controls at a "1" or higher for language and violence. Thus, the system 10 is flexible in that it lets the user to specifically set parental control ratings for different categories, search the web for content that meets that criteria, and then allow the acceptable content to pass through the filter to a consumer.

The system 10 also provides a video editor that can customize video according to user preferences. In the case of "Facing the Giants," the users will be given the option to edit the movie for their personal consumption. They will be given the option to create a mark in and out points for each of the offensive language instances or violent scenes. The edited versions will be resubmitted to a source for rating. After rating with edits, the source will provide back an "edited" version of the ratings. If the "edited" rating for "Facing the Giants" gives it "0s" on all parameters, all users will have access to it. When the user plays this content with parental controls all set at "0," the edit list from the user who created it will be downloaded with the full movie, and the playback works according to the user edits.

A method of operation will now be described. It will be appreciated that this is but one exemplary embodiment and that other are contemplated. First, a user would access the Media Manager through a media device such as a TV set device, a mobile device, a PC or other digital system. The user would set up the parental controls user interface settings by selecting a numeric value for sex, language, violence, drugs, nudity and other individual settings.

Next, the user would search for media. The media manager will only present media that can be experienced without any of the inappropriate content blocked within the parental controls user interface. The user will play, read, view or otherwise experience the media that has been filtered or edited by the media manager. Seamless to the user, the system will allow the user to experience content without seeing any content defined as offensive by the user. In some cases the content will be blocked in its entirety, but in others the system will edit or present an edited version of the content in such a way to remove offensive material from content that previously had offensive material in its original state.

Additionally, the user will have the option to rate or edit content for the greater community of users. For example, the user will be given the option to upload and submit a rating or apply for a rating from the community or from an approved third-party rating system for content provided by the user.

The user will also be given the opportunity to mark specific chunks of content as inappropriate based on a numeric value on sex, language, violence, drugs, nudity or other parameters to be set by the user. The user will be given the ability to edit the content and share their edits with the community. The edited content will be submitted to be rated as new content for the filtering system. The user will have the ability to share ratings, parental control settings and edited material with social media and within the media manager user community. Additionally, this rating system and parental control technology could be used as an improvement on a search engine or media player of any kind.

The system 10 could produce a rating database for content. The system 10 could also produce an edit list or a library of content that has been edited for inappropriate material. The system 10 could also produce a search engine technology that is superior to others in getting personalized results. The system 10 could produce media content.

It will be appreciated that the aforementioned methods, systems and devices may be modified to have some components and steps removed, or may have additional components and steps added, all of which are deemed to be within the spirit of the present disclosure. Even though the present disclosure has been described in detail with reference to specific embodiments, it will be appreciated that the various modification and changes can be made to these embodiments without departing from the scope of the present disclosure as set forth in the claims. The specification and the drawings are to be regarded as an illustrative thought instead of merely restrictive thought.

What is claimed is:

1. A digital parental controls system comprising:
    a computer;
    a program; and
    a user interface device for filtering media content,
    wherein the program when executed by the computer:
    perform a search, based on a user login to a first screen, to determine whether a user is a parent or guardian user or a child user;
    if the search indicates that the user is the parent or guardian user, displays a second screen including, in a first area of a first column, a plurality of sliding bars to set respective levels of user-defined content filters relative to a maturity scale for each of a plurality of categories for a first media content type and, in a second area of a second column, a blocking tab and a skip tab for a second media content type, wherein the user-defined content filters define a respective content level for each of the plurality of categories, and at least one of the blocking tab is operative to block streaming content, and the skip tab is operative to skip content parts including at least one of sex, vulgarity, and violence;
    if the search indicates that the user is the child user, displays a third screen that prevents the user from modifying the respective levels of the user-defined content filters,
    receives pre-existing ratings information and user inputs by the user interface device regarding the respective levels of the user-defined content filters, and
    automatically builds a dynamic library of content ratings using pre-existing ratings information and the user inputs from the user interface device.

2. The system as claimed in claim 1, further comprising a media manager module that builds the dynamic library by pulling the pre-existing ratings information from a plurality of sources and propagating fields with user inputs from the user interface device;
    wherein the system combines multiple ratings sources into a ratings list and thereafter updates the ratings list;

wherein the system is configured to apply ratings only to individual content portions from the multiple ratings sources, segment the individual content portions from the multiple ratings sources, and block only the individual content portions from the multiple ratings sources; and wherein the individual content portions are defined as offensive by the user inputs in the fields with user inputs of the user interface device.

3. The system as claimed in claim 1, further comprising a parental controls user interface module.

4. The system as claimed in claim 1, further comprising a filtering module.

5. The system as claimed in claim 1, further comprising a rating system module.

6. The system as claimed in claim 1, further comprising a content extraction module to replace offensive content with transition content.

7. The system as claimed in claim 1, further comprising a server in communication with the computer.

8. The system of claim 1, wherein the first media content type of the first area is from a first source and the second media content type of the second area is from a second source that includes internet streaming content; and wherein the system simultaneously filters content from at least three sources according to the user inputs in the fields of the user interface device.

9. A system for computer based digital parental controls, the system comprising:
a user interface device for filtering media content that provides parental controls using
a ranking system that ranks items into degrees of severity; and
a media filtering system that,
performs a search, based on a user login to a first screen, to determine whether a user is a parent or guardian user or a child user,
if the search indicates that the user is the parent or guardian user, displays a second screen including, in a first area, a plurality of sliding bars to set respective user-defined content filters relative to a maturity scale for each of a plurality of categories for a first media content type and, in a second area, at least one of a blocking tab and a skip tab for a second media content type, and
if the search indicates that the user is the child user, displays a third screen that prevents the user from modifying respective levels of the user-defined content filters,
wherein the user-defined content filters define the respective content levels for the plurality of categories.

10. The system as claimed in claim 9, further comprising a server.

11. The system as claimed in claim 9, further comprising a media extraction system that operates to extract out essential content from a medium, and placing it in an ideal display on the user interface device.

12. A system for filtering media content comprising:
a server that hosts a parental controls software program; and
a user interface device for filtering media content that performs a search, based on a user login to a first screen, to determine whether a user is a parent or a guardian user or a child user,
if the search indicates that the user is a parent or guardian user, provides a second screen that permits selection of desired content by displaying in a first area a plurality of sliding bars to set respective user-defined content filters relative to a maturity scale for each of a plurality of categories and in a second area at least one of a blocking tab and a skip tab, and
if the search indicates that the user is the child user, provides a third screen that prevents the user from modifying respective levels of the user-defined content filters,
wherein the user-defined content filters define the respective content levels for the plurality of categories.

13. The system as claimed in claim 12, further comprising an extraction feature to remove undesired content.

14. The system as claimed in claim 12, further comprising an extraction feature to replace undesired content, then displaying desired content to an output device.

15. The system as claimed in claim 12, further comprising a library of content ratings, the library is dynamic.

16. The system as claimed in claim 12, further comprising a master database of media content.

17. The system as claimed in claim 12, wherein the system is used with one of a movie, a DVD, or the internet.

18. The system as claimed in claim 12, wherein the user interface device is operable to show sample content that is available to be viewed by a consumer.

19. The system as claimed in claim 12, further comprising a feature that crawls the internet and captures data relating to ratings of content including movie content.

20. The system as claimed in claim 12, further comprising a capture feature of capturing content from a source, selecting desired content using the user-defined content filter, and then present desired content without caching the desired content.

21. The system as claimed in claim 12, wherein the plurality of categories of the user interface device include each of sex, language, violence, drugs, and nudity,
wherein the blocking tab is configured to block streaming internet content, and
wherein the skip tab is configured to skip content parts including at least one of sex, vulgarity, and violence.

22. A method of a user interface device for controlling media content, the method comprising:
filtering media content in communication with a server having media content, the user interface device providing content control with the following operations:
determining, based on a user login to a first screen, whether a user is a parent or guardian user or a child user;
if the user is the parent or guardian user, displaying a second screen including, in a first area, a plurality of content filter selectors relative to a maturity scale associated with a plurality of content categories and, in a second area, a filtering tab associated with the plurality of content filter selectors, wherein the displaying is in response to a search to determine if the user is the parent or guardian user or the child user,
if the user is the child user, displaying a third screen that prevents the user from modifying the plurality of content filter selectors,
receiving at least two selections from at least one of the first and second areas, and
providing media content while at least one of skipping and blocking portions of the media content in response to the at least two selections.

23. The method of claim 22, wherein the plurality of categories include each of sex, language, violence, drugs, and nudity.

* * * * *